United States Patent [19]

Wallman

[11] 4,120,084
[45] Oct. 17, 1978

[54] METHOD OF MAKING IMPROVED LUG AND HOLE CONNECTION BETWEEN SHEET METAL ELEMENTS

[76] Inventor: Knut Olof Lennart Wallman, Fergas AB, Oskarsgatan 10, S-582 21 Linköping, Sweden

[21] Appl. No.: 795,859

[22] Filed: May 11, 1977

[30] Foreign Application Priority Data

May 12, 1976 [SE] Sweden .............................. 7605383

[51] Int. Cl.² ........................................... B23P 11/00
[52] U.S. Cl. ....................................... 29/509; 29/525; 29/156.8 CF; 403/248; 403/274; 403/360
[58] Field of Search ........ 29/509, 522, 525, 156.8 CF; 285/222; 403/274, 248, 360

[56] References Cited

U.S. PATENT DOCUMENTS

| | | | |
|---|---|---|---|
| 964,511 | 7/1910 | Goldie, Jr. ............................ | 29/509 |
| 1,609,597 | 12/1926 | Arnt .................................... | 29/509 |
| 2,264,897 | 12/1941 | Becker et al. ........................ | 29/509 |
| 2,302,095 | 11/1942 | Bartch ......................... | 29/156.8 CF |
| 2,302,501 | 11/1942 | Mears .................................. | 29/509 |
| 2,908,418 | 10/1959 | Gallay ................................. | 29/509 |
| 3,571,909 | 3/1971 | Stern .................................... | 29/509 |
| 3,911,516 | 10/1975 | Einhorn ............................... | 29/525 |

FOREIGN PATENT DOCUMENTS 427,843   5/1935   United Kingdom ...................... 29/509

*Primary Examiner*—C.W. Lanham
*Assistant Examiner*—Daniel C. Crane
*Attorney, Agent, or Firm*—Ira Milton Jones

[57] ABSTRACT

A lug-and-hole connection between a first, lug-bearing sheet metal element and a second, apertured sheet metal element is made by so forming the hole in the first element that it is bounded by out-turned, opposite, convergent wall portions spaced apart, at the narrowest distance between them, by a distance slightly less than the lug thickness. The hole is made without removing material from the first element, as by forcing through it the wedge-shaped tip of a chisel-like punch while backing that element with a flat-topped die having cylindrical cavity. After the lug is inserted into the hole, a tip portion of the lug, which projects beyond the wall portions, is swaged to form it into a rivet-like head that snugly overlies the outer edges of the wall portions, but the wall portions are not reworked in the head forming operation.

5 Claims, 18 Drawing Figures

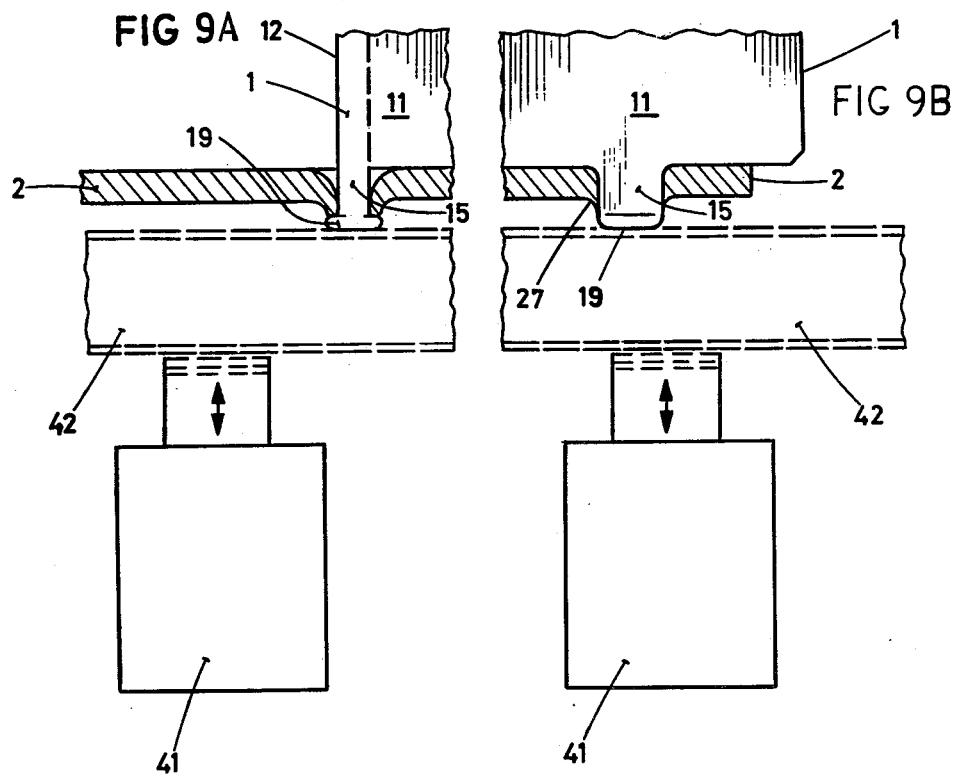

METHOD OF MAKING IMPROVED LUG AND HOLE CONNECTION BETWEEN SHEET METAL ELEMENTS

The present invention relates to a method of forming permanent connections between mutually perpendicular sheet metal elements, with an end edge of one of the elements engaged against a surface of the other element, as in the connection between a blade of a squirrel-cage centrifugal blower rotor and one of the end rings or end plates of the rotor; and the invention is more particularly concerned with a method of forming a connection of the type comprising a lug on one of the elements, locked in a hole in the other one.

The prior U.S. patent to M. J. Bartch, U.S. Pat. No. 2,302,095, discloses a connection of the general type to which the present invention relates. As applied to the rotor of a centrifugal blower or fan, the Bartch patent discloses an elongated sheet metal blade which is generally rectangular but which has a pair of laterally spaced lugs that project endwise from an end edge of the blade. The end member to which that end of the blade is secured, which can be an end ring or an end plate of the rotor, has a pair of holes in which the lugs are received. The holes are so formed in the end member that each hole is surrounded by an upset rim portion that projects out of the plane of the end member and beyond an outer surface thereof. After the lugs are inserted into the holes from the inner side of the end member, the ends of the lugs and the metal around the rims of the holes are subjected to a reforming operation whereby a head is formed on each lug and the upset metal around each hole is worked back to substantially coplanar relationship with the rest of the end member so that the outer surface of the end member is once again substantially flat.

In one part of the disclosure of the Bartch patent it is said that the preferred manner of forming the holes is to pierce the end member with a suitably formed punch, so that no metal, or very little, will be removed from the end member, but the hole will instead be developed by displacing metal outwardly to form the upset rim portion. It will be evident that when a lug is inserted into a hole thus formed, there is too much metal present to allow the upset portion to be restored to its coplanar condition. The patent therefore recommends that for a smoother or more refined job, each hole should be formed by subjecting the end member to two operations, in the first of which a punch is used to remove from the end member an amount of metal substantially equal to the cross-section area of the lug, and the second of which forms the extruded upset rim portion around the hole.

With holes formed in the end member by either of these procedures, the patent contemplates that the material of the upset portion around each hole, when worked back to its original condition of coplanar relationship with the remainder of the end member, will be forced into secure, transversely squeezing engagement with the lug in the hole, to ensure a tight connection.

In practice, the method disclosed by the Bartch patent has disadvantages which are serious enough to preclude its use in the commercial production of blower rotors and other structures that are subject to rotation or vibration. As is the case with any metal body that undergoes plastic deformation by stretching in one direction and contraction in cross-section, the material that is placed under tension by the formation of the upset rim around the hole acquires a high resistance to renewed plastic deformation in the opposite direction. Thus, even though the volume of material removed from the end member by the above-mentioned punching operation is accurately equal to the cross-section area of the lug to be received in the hole, the upset material around the hole, when forced back to coplanar condition by the riveting operation, will almost inevitably wrinkle or buckle locally, especially at the inner surface of the end member. Such wrinkling or buckling, while perhaps not objectionable with respect to the joint itself, creates stresses in the material of the end member for some distance edgewise out from the hole. Particularly in cases where the end member is a narrow end ring, such stresses can warp it out of flatness so that it wobbles as it rotates. Wobbling is unacceptable in a rotating machine element such as a blower rotor because it results in unbalance and vibration.

Another disadvantage in the method of the Bartch patent, closely connected with the one just described, is that removing material from the end member, in a punching operation that precedes the extruding operation by which the upset rim is formed, requires the provision of a tool separate from that used for the extruding operation, and of course requires a press set-up for each of the operations and an additional handling of the workpieces. All of this substantially increases the cost and complicates the production of the machine elements comprising the connection.

Perhaps the most important disadvantage of the connection obtained with the method disclosed by Bartch is that it does not result in a dependable securement. As the upset rim portion of the end member is worked back to coplanar relationship with the rest of that member, its edge portions dig into the opposite surfaces of the lug with a pincers effect, creating stress-raising grooves in the surfaces of the lug. Furthermore, to allow the material of the upset portion to be worked all the way back to coplanar relationship with the rest of the end member, the lug must have sharply square corners at the junctions of its side edges with the end edge of the blade. In large, highly stressed rotating machines, such sharp corners and surface grooves encourage the formation of separation cracks which grow until the lug is eventually broken off of the main body of the blade, so that there is no longer a connection between the blade and the end member.

In another prior method of forming a lug and hole connection, the hole was formed by merely punching material out of the element in which the lug was to be received, the hole being given, as accurately as possible, the shape and size of the lug cross section so that the lug could be closely received in it. With that method, where a blower rotor end plate or the like had a number of holes in it, and a number of blades had to be assembled with it, each blade had to be very accurately located and oriented for the assembly step so that the lug or lugs on the ends of all of the blades would fully enter the several holes that were intended to receive them. Any slight misalignment between even one lug and its hole would prevent proper assembly. Furthermore, the tooling needed for forming such holes tends to be costly.

Another prior method comprised punching or drilling circular holes in the lug receiving element, in each of which a lug was received. The diameter of each hole was substantially equal to the width of the lug to be received therein. After the elements were assembled, the projecting outer end portion of each lug was cleft with a chisel-like tool, to increase its width and lock the lug into the hole. This produced a rough, ragged appearance at each joint as well as leaving numerous sharp points and corners that made the assembly unpleasant to handle. Furthermore, since the lugs did not completely fill the holes, a blower rotor assembled by this method tended to be noisy in operation, due to air moving through the spaces in the holes not filled by the lugs. Of course a connection having circular lug holes was not suitable for small blower rotors on which there could be only one lug at each end of each blade, inasmuch as the blade was not confined against rotation about the axis of the hole.

A blower rotor or similar rotating device is subject to vibration due to accumulations of dirt which may unbalance it, and is subjected to more or less abrupt accelerations during starting and stopping. If there is any loose play between the lugs and the plate-like element in which they are received, such play will increase in time, due to wear induced by the vibration forces encountered during operation, with the result that the rotor will become noisy and the connections will eventually break. Such play is especially likely in a blower rotor wherein the lugs on the blades have riveted heads that directly overlie the outer surface of an end plate, such as would be produced by most of the above described methods.

With the foregoing considerations in mind, it is a general object of this invention to provide an improved method of forming a very secure lug and hole connection between mutually perpendicular sheet metal elements, one of which has a lug projecting endwise outwardly from an end edge thereof and the other of which has a hole in which said lug is received, said end edge on the one element being engaged along its length with one surface on the other element, and the lug having a head formed thereon by a riveting operation performed after the elements are assembled.

It is also a general object of this invention to provide a method of making a connection of the character described that possesses all of the advantages but none of the disadvantages of prior such connections, and, in particular, enables the lug-receiving holes to be formed in one simple operation and with the use of inexpensive tooling, facilitates assembly with one another of the elements to be connected, does not impose upon the element having the holes any stresses that would tend to deform said element out of flatness, does not produce any grooving of the lug that would induce fracture cracks, and allows the element that has the lug thereon to be made with rounded junctions between the side edges of the lug and the adjacent end edge portions of that element to further ensure against the lug breaking off under vibration or load.

Another object of the invention is to provide a method of making a lug and hole connection of the character described wherein the sheet metal element that has the lug receiving hole or holes therein is subjected to only one hole-forming operation in which a single rather simple and inexpensive tool is used and which produces a hole that guides the lug to its proper position and confines it frictionally against withdrawal so that the elements tend to remain preliminarily assembled with one another even before the final step is performed that locks the lug permanently into the hole.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate several complete examples of the practice of the invention according to the best modes so far devised for the practical application of the principles thereof, and in which:

FIG. 7A is a fragmentary view showing a blower rotor blade and an end ring in position for assembly with one another for making a connection between them in accordance with the principles of this invention, the blade being seen in edge view and the end ring in cross section;

FIG. 7B is a view generally similar to FIG. 7A but taken at right angles to the plane of FIG. 7A;

FIGS. 8A and 8B are views generally corresponding to FIGS. 7A and 7B, respectively, but showing the blade and the end ring preliminarily assembled with one another;

Figure 10:
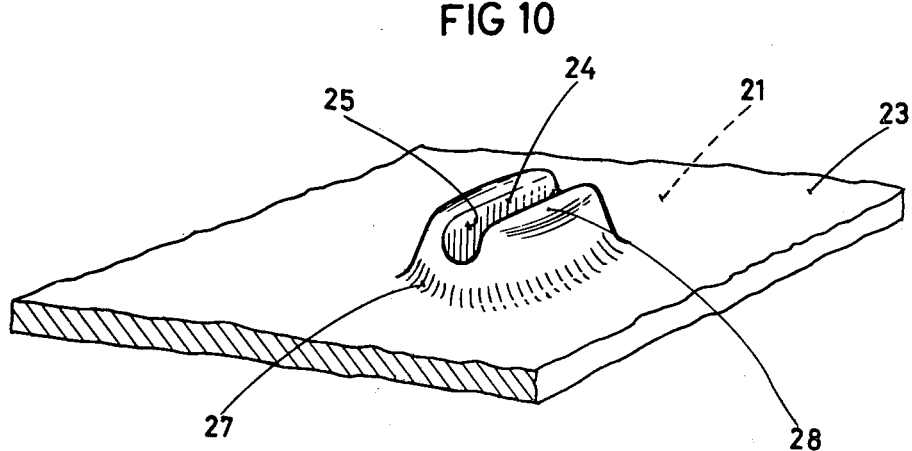
Figure 11:
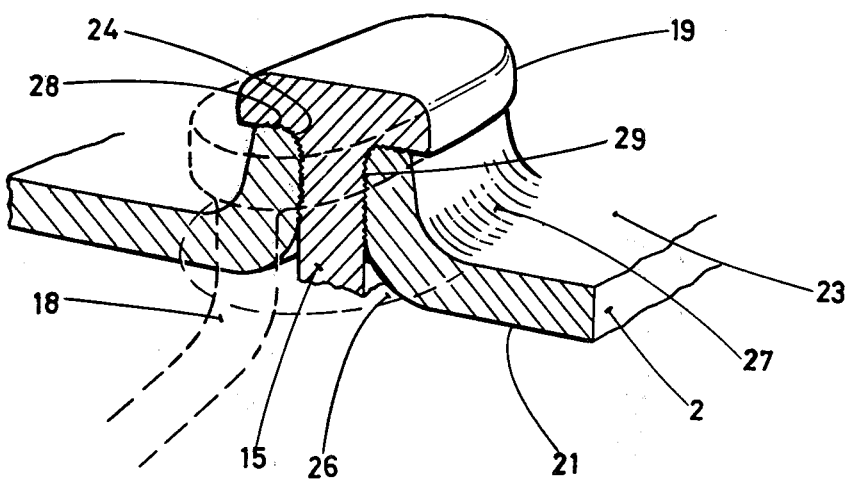
Figure 13:
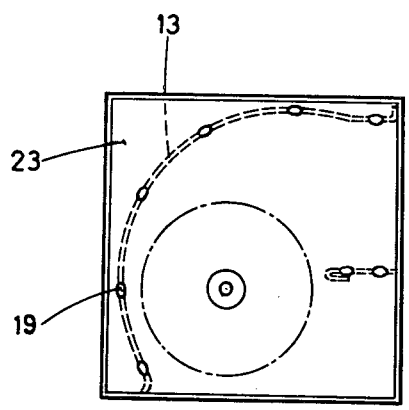
Figure 12:
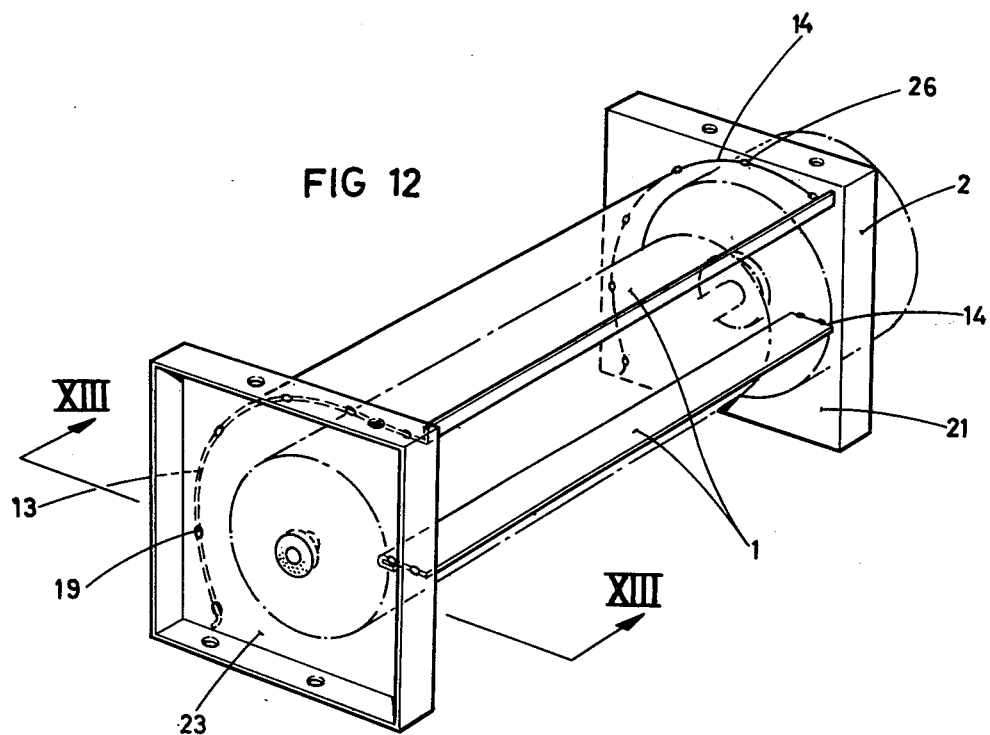
Figure 15:
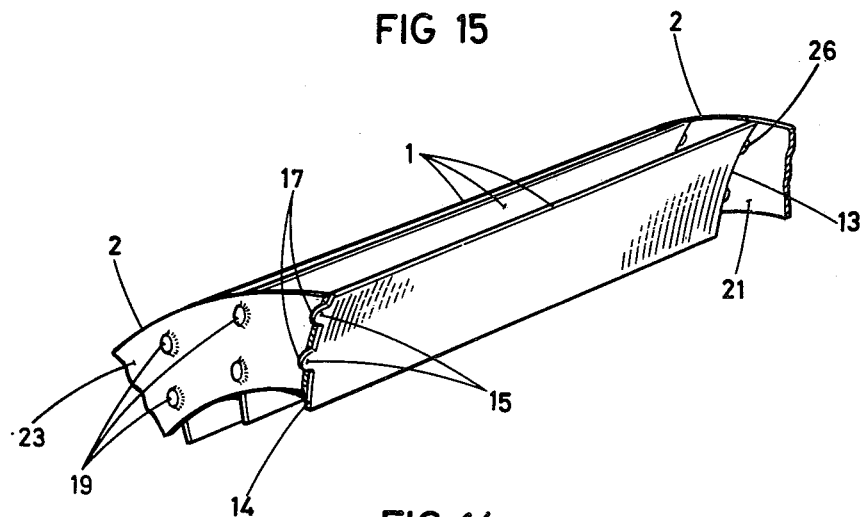
Figure 14:
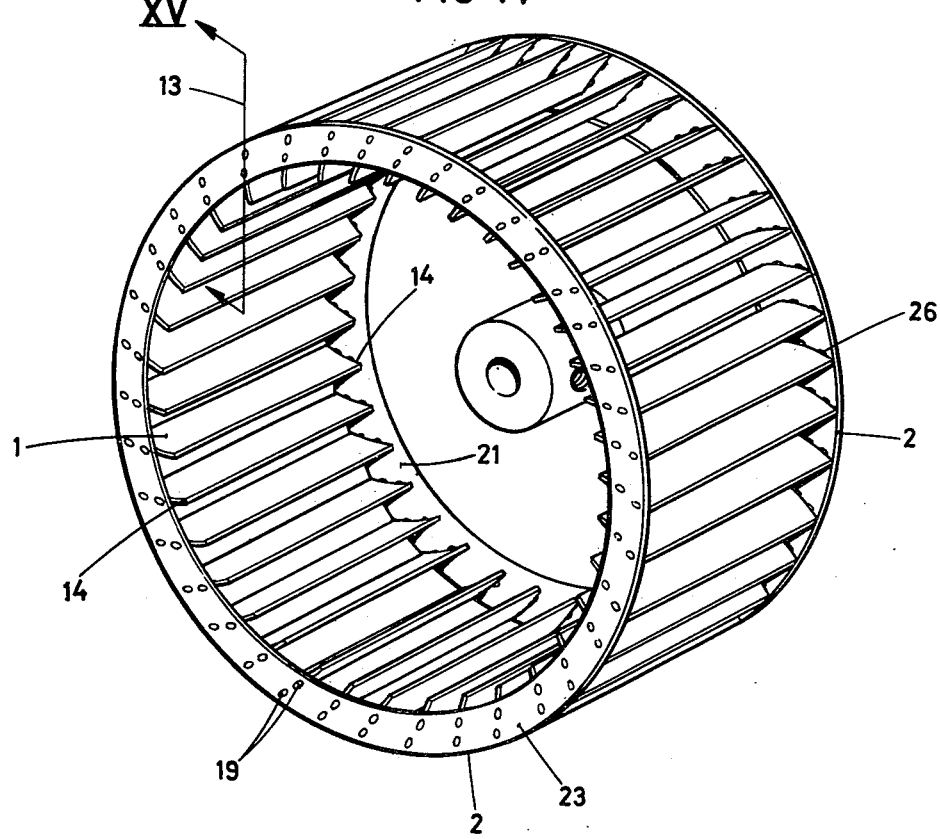

FIGS. 9A and 9B correspond respectively to FIGS. 8A and 8B but illustrate the parts in finally assembled relationship and locked to one another, in relation to apparatus that can be employed for the final riveting operation;

FIG. 10 is a fragmentary perspective view on an enlarged scale, looking at the outer surface of the sheet element having the lug receiving hole therein, after said hole is formed;

FIG. 11 is a view on an enlarged scale, partly in perspective, partly in section, showing securement of the lug in the hole at the completion of the method of this invention;

FIG. 12 is a perspective view of a blower housing having wall portions connected in accordance with the principles of this invention;

FIG. 13 is an end view of the blower housing shown in FIG. 12;

FIG. 14 is a perspective view of a cross-flow blower rotor having lug connections made according to the method of the present invention; and FIG. 15 is a fragmentary view on an enlarged scale, partly in perspective and partly in section, of a part of the rotor illustrated in FIG. 14, but with one of the blades not yet permanently locked to the end rings.

Referring now to the accompanying drawings, the method of this invention provides, in each case, for a lug and hole connection between a pair of sheet-metal elements 1 and 2. The element 1 is a lug-bearing element, having one or more tab-like lugs 15 thereon, while the element 2 is apertured to receive the lug or lugs. For purposes of illustration the invention is described in relation to the assembly of the housing or of the rotor of a cross-flow centrifugal blower, but it will be understood that the invention is applicable to many other types of structures and devices.

In the case of a blower housing (see FIG. 12) the lug-bearing sheet metal element 1 can be a curved side wall or an air inlet guide vane, while the apertured element 2 is a substantially flat end wall of the housing. There are of course two of the end walls, held in opposing spaced apart relationship by their respective connections with the side wall and the guide vane, both of which extend between the ends walls and are normal to them.

In the case of a blower rotor (see FIG. 14) the lug bearing element 1 may be one of the elongated rotor blades, and the apertured element 2 can be one of the end plates or end rings of the rotor. The rotor will have two of the end members that are fixed in coaxial relationship with one another by their respective connections with numerous blades that extend between them, lengthwise parallel to the rotor axis.

In any case the lug-bearing element 1 has an end edge 14 thereon, and has at least one integral tab-like lug 15 which projects lengthwise outwardly beyond that end edge; while the element 2 has a hole 22 in which the lug 15 is received. When the two elements 1 and 2 are connected, the end edge 14 on the lug-bearing element 5 is engaged along at least a substantial part of its length against an inner surface 21 on the apertured element 2, and the element 1 extends inwardly away from that surface, substantially normal thereto. The two elements thus engage one another along a joint line 13 that is defined by the end edge 14 on the lug-bearing element 1.

In accordance with the method of this invention, each of the holes 22 in the apertured sheet metal element 2 can be formed in a single operation by means of apparatus such as is illustrated in FIGS. 1–4. The apparatus comprises a press in which a punch 34 and a die 31 are mounted for vertical movement towards and from one another. The punch 34 projects downwardly from a column-type fixture 30, being secured in a punch holder 33. The die has a flat top surface and has a cylindrical cavity 32 that is coaxially aligned with the punch 34 and of a diameter to receive the same.

As the press head and the die are brought together, the punch 34 is forced through the sheet metal element 2, which rests on the flat top surface of the die 31 with what is to be its inner surface 21 facing upwardly. As the punch and the die thereafter move apart, a conventional stripper plate, spring-urged downwardly relative to the press head, disengages the workpiece from the punch.

The punch 34, which can be cylindrical along most of its length, is formed with a wedge-like or chisel-shaped lower end portion having opposite flat surfaces which are inclined to the axis of the punch and which meet at a sharp edge that extends diametrically across the center of the punch and hence also diametrically across the die cavity.

Figure 1:
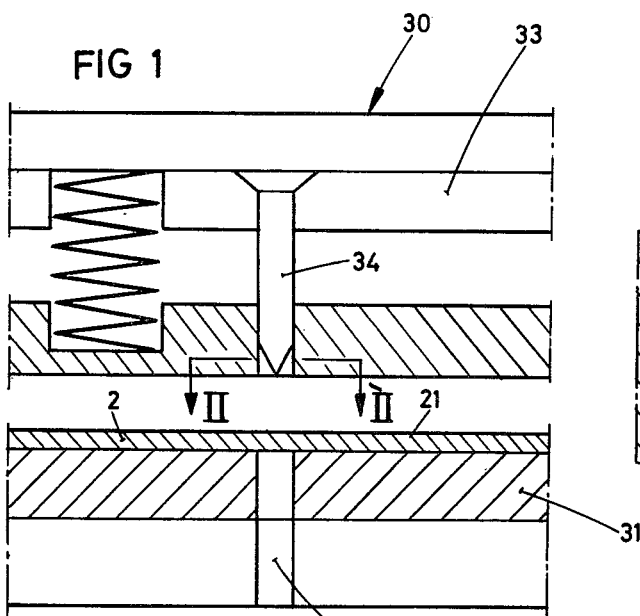
FIG. 1 is a sectional view through a tool set-up for forming a lug-receiving hole in one sheet metal element in accordance with the method of this invention.
Figure 2:
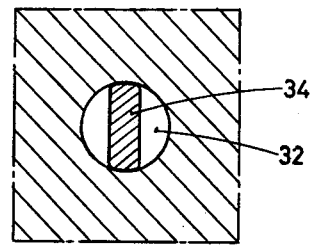
FIG. 2 is a view in section taken on the plane of the line 2—2 in FIG. 1.
Figure 3:
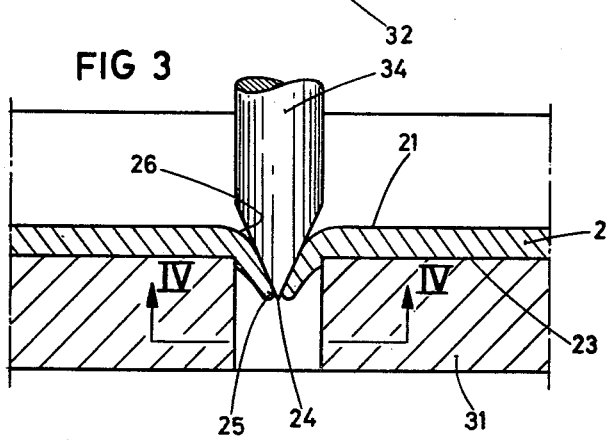
FIG. 3 is a sectional view generally like FIG. 1 but showing only the lower portion of the tool set-up, and on a larger scale than FIG. 1, illustrating formation of a hole in the one sheet metal element.
Figure 4:
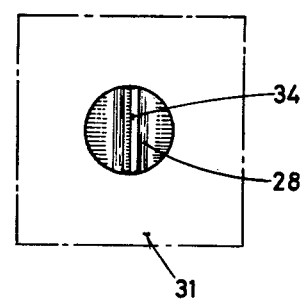
FIG. 4 is a view in section taken on the plane of the line 4—4 in FIG. 3.

As shown in FIGS. 1 and 3, the cylindrical surface of the die cavity 32 can meet the flat upper surface of the die around a substantially sharp edge. When the punch 34 and the die 31 are brought together, with a blank between them that is to become the apertured element 2, the edge on the punch engages against the sheet metal, and, as shown in FIG. 3, portions of the sheet metal adjacent to that edge are stretchingly deformed downwardly between the inclined surfaces on the punch and the upper edge of the cavity 32 in the die. The material of the element 2 that is near the punch is thus caused to conform itself substantially to the shape of the tip of the punch while being locally forced out at the underside of the element 2 and being reduced in thickness ahead of and around the edge on the punch. Finally the stretched material yields, and the tip portion of the punch pushes through it to form a slot which extends across the cavity 32 in the die, as shown in FIG. 4. The punch is withdrawn when the slot has been widened to a substantially rectangular opening 24 having a width across its narrower dimension that is substantially equal to the thickness of the sheet material of which the lug is formed but is preferably slightly less than that thickness. The distance across the longer dimension of the opening 24 is determined by the diameter of the punch and of the cavity in the die and is substantially equal to the width of the lug to be received therein.

By the operation just described, the material of the sheet metal element 2 that is adjacent to the hole is formed into a pair of opposite out-turned wall portions 25 which merge into the adjacent undeformed portions of that element around transition portions that define curving inner surfaces 26, so that, as viewed in section across the smaller width dimension of the hole, the inner hole surface is more or less bell-mouthed and funnel shaped and tapers in the direction from the inside surface 21 to the outside surfce 23 of the element 2. The distance between the rounded and convergent surfaces 26 at the inner end of the lug-receiving aperture is substantially greater than the thickness of the lug; but near the outer edges of the wall portions 25 those wall portions converge rather gradually towards one another and, as mentioned above, they are spaced apart at their outer edges by a distance slightly less than the thickness of the lug. It will be evident that the rounded entry surfaces 26 guide the lug smoothly into the close fitting part of the hole, even if the lug is not perfectly aligned with the hole as its insertion begins.

On an element 2 that has been apertured with the hole forming apparatus illustrated in FIGS. 1–4, the outwardly turned wall portions 25 are substantially separate from one another, and the sharp edge around the top of the cavity 32 in the die leaves a perceptible impression in them at their junctions with the undisplaced material of the rest of the element 2, as can be seen from FIG. 3.

Figure 5:
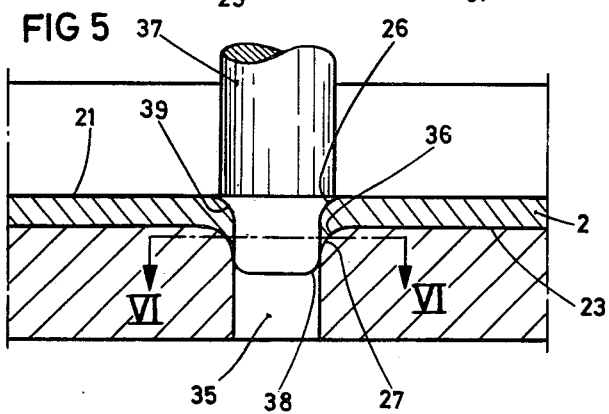
FIG. 5 is a view generally similar to FIG. 3, but taken at right angles to the plane of FIG. 3 and illustrating a modified form of the hole-forming means.
Figure 6:
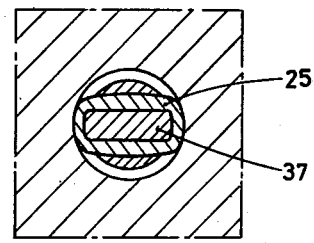
FIG. 6 is a view in section taken on the plane of the line 6—6 in FIG. 5.

In the modified hole forming apparatus of FIGS. 5 and 6, which is preferred to that of FIG. 1–4, the junction between the flat top surface of the die and the cylindrical surface of the cavity 35 therein is rounded all around the cavity, as at 36. The chisel-shaped tip portion of the punch 37 has rounded corners 38 at the ends of its edge. That tip portion is of a diameter to be closely receivable in the die cavity 35, but the shank portion of the punch is of substantially larger diameter, and the tip portion flares upwardly into the shank portion at a concavely rounded shoulder 39 all around the punch, which shoulder substantially conforms to the curvature of the rounded top edge 36 of the die cavity. As a result of the rounded surfaces 36 and 39, there is a more or less bell-mouthed and nearly circular transition portion all around the inlet end of the hole produced by the punch and die of FIGS. 4 and 5, as illustrated in FIGS. 6, 7 and 10, providing an outer fillet or transition surface 27 between the outer surface 23 of the element 2 and the hole wall 25, and also providing an inner outwardly convergent rounding 26 between the inner surface 21 of the element 2 and the interior surfaces of the hole walls 25.

Because of the rounded taper 26 of the inner surface of the hole all around the perimeter of the hole, a lug 15 is guided or funneled into the hole both widthwise and in its thickness directions, as can be seen from FIGS. 7A and 7B. Furthermore, the element 2 that carries the lug 15 to be received in the hole can have rounded inside corners 18 at the junctions of its end edge 14 with the side edges 16 of the lug. The inside radius of these rounded corners 18 can match the outside radius of the rounded bell-mouth surfaces 26 in the interior of the opening. Forming the element 2 with the rounded inside corners 18 is of course preferable to having sharp corners between the lug and the end edge 14 of the element 2, inasmuch as sharp corners would give rise to stress concentrations that would encourage fatigue fractures between the lug and the main part of the element.

With the hole for the lug formed as last described, it is again preferred that the narrower dimension across the hole mouth 24 be slightly smaller than the thickness of the lug to be received therein, so that some endwise force must be employed to insert the lug fully into the hole and so that the lug will be frictionally retained in the hole even before a final heading or riveting operation is performed that permanently locks the lug against withdrawal from the hole. Such dimensioning of the hole relative to the lug thickness also ensures maximum rigidity for the finished structure.

It will be apparent that where a number of lugs are to be connected with the apertured element 2, as in the case of a blower rotor end ring in which the lugs on numerous blades are to be received, the rounded and tapering bell-mouth inlets 26 to the lug holes will facilitate assembly of the elements 1 and 2 with one another by virtually funneling each lug into the proper position in its hole. Hence, in assembling blower rotor blades with an end ring, the lugs on the several blades will all enter their proper holes in the end ring even though some or all of the blades may be slightly out of the exact positions in which they are intended to be secured to the end ring.

The length of each lug 15 is such that when the lug-bearing element 1 is in assembled relation to the apertured element 2, with the end edge 14 on the lug-bearing element engaged along its length against the inner surface 21 of the apertured element, an outer end portion 17 of the lug projects a distance beyond the outer edges 28 of the out-turned wall portions 25.

After assembly of the lug-bearing element or elements 1 with the apertured element or elements 2, the last step in the procedure is to apply endwise deforming force to the projecting end portion 17 of each lug in order to work it to the form of a rivet-like enlarged head on the lug that provides a laterally projecting rim 19 which snugly overlies the outer edges 28 of its adjacent wall portions 25, as best seen in FIG. 11. It is to be emphasized, however, that this heading operation is continued only to the point of establishing the head in firm engagement with the edges 28 of the underlying wall portions, and that no substantial reworking of the material of those wall portions is to result from it. Consequently, there is no warping or other distortion of the apertured element 2 as a result of forming the connection, since only insignificant stresses are introduced into that element.

After the heading operation is thus performed, the metal of the apertured element 2 snugly confines the lug against relative displacement in its width and thickness directions without in any wise biting into it, while the head on the lug cooperates with the end edge 14 on the lug-bearing element 1 to confine that element against relative endwise displacement. Furthermore, the upsetting operation causes the material of the lug that is between the hole walls to flow outwardly into firm engagement with the inner surfaces of those walls in the zones designated by the zigzag lines 29 in FIG. 11.

Because the hole in which the lug is received is non-circular, the lug cannot rotate in the hole. This is particularly advantageous in the case of a small blower rotor having narrow blades. Each such blade need have only one lug at each end thereof, and each lug can have adequate width to provide a very sturdy connection between its blade and the end ring or other apertured element in which it is received.

The heading operation can be performed with the use of a conventional pneumatic hammer 41 (see FIGS. 9A and 9B). Where the heading operation is to be performed on a number of lugs that lie along one joint line 13, as in the case of the lugs on one vane of a blower rotor, all of those lugs can be headed simultaneously by attaching to the pneumatic hammer a rigid face plate 42 that is large enough to engage the lugs at one end of the rotor while engaging the lugs on the same vane at the opposite end of the rotor against a similar face plate that is rigidly fixed.

From the foregoing description taken with the accompanying drawings it will be apparent that this invention provides a simple and easily performed method of forming a secure lug-and-hole connection between a pair of sheet metal elements such as a blade of a cross-flow blower rotor and an end ring or end plate thereof.

Those skilled in the art will appreciate that the invention can be embodied in forms other than as herein disclosed for purposes of illustration.

The invention is defined by the following claims.

I claim:

1. The method of making a permanent connection between a first sheet metal element having inner and outer surfaces and a second sheet metal element having an integral lug projecting lengthwise outwardly beyond an end edge thereof, whereby the elements are disposed substantially normal to one another with said end edge on the second element engaged along its length against the inner surface of the first element and with said lug projecting lengthwise through a hole in said first element, said method being characterized by:
   A. forming the hole in the first element by
   (1) applying outward force to the inner surface of said first element along a line segment having a length no greater than the width of the lug, while
   (2) applying inward force to the outer surface of said first element around a circular zone circumscribing said line segment, to form the hole without removal of material from the first element, and to produce out-turned wall portions at opposite sides of the hole and a convexly rounded surface between the inner surface of each wall portion and the adjacent undeformed portion of the inner surface of the first element, and (3) said hole being so formed that the distance between said out-turned wall portions is slightly less than the thickness of the second element;

B. so forming the second element that the lug thereon has a length greater than the projected distance from the inner surface of the first element to the outer edges of said wall portions;

C. inserting the lug into the hole in the direction from the inner towards the outer surface of the first wall element until said end edge on the second element is engaged against the inner surface of the first element; and D. by applying substantially endwise force to the projecting end portion of the lug over substantially the entire end area thereof, forming a laterally enlarged head thereon which firmly engages the outer edges of said wall portions, but terminating the application of such endwise force before substantial reworking of said wall portions occurs.

2. The method of making a permanent connection between a first sheet metal element having inner and outer surfaces and a second sheet metal element having an integral lug projecting lengthwise outwardly beyond an end edge thereof, whereby the elements are disposed substantially normal to one another with said end edge on the second element engaged along its length against the inner surface of the first element and with said lug projecting lengthwise through a hole in said first element, said method being characterized by:

A. forming said hole by
   (1) engaging against the inner surface of said first element a punch having a wedge-shaped tip portion with oppositely inclined flat surfaces that converge to a substantially sharp end edge, and
   (2) while forcing said punch in the direction towards the outer surface of said first element, supporting the first element by applying an opposite force to its said outer surface at a zone of substantial area thereon that closely surrounds the zone to which force is applied by the punch, to thereby produce on said first element out-turned, opposite, spaced apart wall portions which are inclined towards one another in the direction from said inner surface to said outer surface of the first element, and
   (3) terminating application of force to the punch when the distance between said wall portions is slightly less than the thickness of the second element;

B. forming the lug on the second element with such length that when said lug is received in the hole, a tip portion of said lug will project beyond the outer edges of said wall portions;

C. forcing the lug into the hole, in the direction from said inner surface to said outer surface, until said end edge on the second element is engaged against the inner surface of the first element; and D. applying endwise deforming force to said tip portion of the lug across the entire end area of the same, but only to an extent which will produce a head thereon that snugly overlies the outer edges of said wall portions without effecting substantial deformation of said wall portions.

3. The method of claim 2 wherein, as the punch is forced in said direction, opposite force is applied to the outer surface of said first element in a zone of progressively decreasing diameter to produce a bell-mouthed transition portion on said first element between said wall portions and the unworked adjacent portion of the first element.

4. The method of claim 3 wherein said opposite force is exerted by means of a die having a flat surface which is engageable against the outer surface of the first element and a cylindrical cavity that opens to said flat surface, with a rounded edge all around said cavity at its junction with said flat surface whereby the progressive decrease in the diameter of said zone is effected.

5. The method of claim 3, wherein the second sheet metal element is formed with rounded inner corners at the junctions of the side edges of its lug with its end edge, the radius of said corners being substantially equal to the outside radius of the inner surface of said bell-mouthed transition portion.

* * * * *